(12) United States Patent
Arenz

(10) Patent No.: US 8,666,596 B2
(45) Date of Patent: Mar. 4, 2014

(54) METHOD AND SYSTEM FOR MANIPULATING THE MOVEMENT OF A VEHICLE BODY OF A MOTOR VEHICLE CONTROLLABLE OR ADJUSTABLE WITH RESPECT TO ITS MOVEMENT PROCESSES AND VEHICLE

(75) Inventor: Andrea Arenz, Velpke (DE)

(73) Assignee: Volkswagen AG, Wolfsburg (DE)

( * ) Notice: Subject to any disclaimer, the term of this patent is extended or adjusted under 35 U.S.C. 154(b) by 800 days.

(21) Appl. No.: 12/739,085

(22) PCT Filed: Oct. 23, 2008

(86) PCT No.: PCT/EP2008/008996
§ 371 (c)(1),
(2), (4) Date: Oct. 22, 2010

(87) PCT Pub. No.: WO2009/053080
PCT Pub. Date: Apr. 30, 2009

(65) Prior Publication Data
US 2011/0035103 A1   Feb. 10, 2011

(30) Foreign Application Priority Data

Oct. 26, 2007   (DE) .......................... 10 2007 051 226

(51) Int. Cl.
*B60G 17/018*   (2006.01)
(52) U.S. Cl.
USPC ........................................................... 701/37
(58) Field of Classification Search
None
See application file for complete search history.

(56) References Cited

U.S. PATENT DOCUMENTS

| 4,749,210 A | 6/1988 | Sugasawa ...................... 280/707 |
| 4,805,923 A | 2/1989 | Soltis ............................ 280/707 |

(Continued)

FOREIGN PATENT DOCUMENTS

| DE | 3918735 | 12/1990 | ........... B60G 17/015 |
| DE | 4113387 | 11/1991 | ........... B60G 17/015 |

(Continued)

OTHER PUBLICATIONS

International PCT Search Report and Written Opinion, PCT/EP2008/008996, 12 pages, Feb. 26, 2009.

*Primary Examiner* — Thomas Tarcza
*Assistant Examiner* — Adam Alharbi
(74) *Attorney, Agent, or Firm* — King & Spalding L.L.P.

(57) ABSTRACT

A method and a system generates signals for influencing the movement of the body of a vehicle, wherein the chain of movements of which can be controlled or adjusted. The movement of the vehicle body is determined by sensors in relation to at least three wheels of the motor vehicle and the vertical acceleration of the vehicle body, the sensor signals that correspond to the determined sensor values are fed to a shock absorber controller which delivers at least one control signal to control actuators, in particular semi-active or active shock absorbers which are used to influence the movement of the body. The control signal for controlling the actuators is determined by the shock absorber controller from the sensor signals, with the aid of condition-dependent adjustment algorithms, taking into consideration current and/or expected conditions in conjunction with selectable requirements for the movement of the vehicle body and driving safety requirements.

20 Claims, 8 Drawing Sheets

(56) References Cited

U.S. PATENT DOCUMENTS

| | | | |
|---|---|---|---|
| 5,168,448 A * | 12/1992 | Matsumoto et al. | 701/37 |
| 5,390,121 A | 2/1995 | Wolfe | 364/424.05 |
| 5,401,052 A * | 3/1995 | Yoshioka et al. | 280/5.503 |
| 5,432,700 A | 7/1995 | Hrovat et al. | 364/424.05 |
| 5,497,325 A * | 3/1996 | Mine | 701/38 |
| 5,539,640 A * | 7/1996 | Kishimoto et al. | 701/40 |
| 6,097,999 A | 8/2000 | Shal et al. | 701/38 |
| 6,157,879 A | 12/2000 | Kwack et al. | 701/37 |
| 2006/0129293 A1* | 6/2006 | Bernzen et al. | 701/41 |
| 2008/0108329 A1* | 5/2008 | Cho et al. | 455/413 |

FOREIGN PATENT DOCUMENTS

| | | | |
|---|---|---|---|
| DE | 4430364 | 2/1996 | B60G 17/018 |
| DE | 19748271 | 5/1998 | B60G 17/015 |
| DE | 10120918 | 10/2002 | B60G 17/015 |
| DE | 10329432 | 1/2005 | B60G 17/015 |
| DE | 102005014237 | 10/2006 | B60G 17/06 |
| DE | 10335057 | 2/2008 | G62D 6/00 |
| EP | 0591754 | 4/1994 | B60G 17/015 |
| EP | 0901082 | 3/1999 | B60G 17/016 |
| WO | 2007/034102 | 3/2007 | B60G 17/0165 |

* cited by examiner

METHOD AND SYSTEM FOR MANIPULATING THE MOVEMENT OF A VEHICLE BODY OF A MOTOR VEHICLE CONTROLLABLE OR ADJUSTABLE WITH RESPECT TO ITS MOVEMENT PROCESSES AND VEHICLE

CROSS-REFERENCE TO RELATED APPLICATIONS

This application is a U.S. National Stage Application of International Application No. PCT/EP2008/008996 filed Oct. 23, 2008, which designates the United States of America, and claims priority to German Application No. 10 2007 051 226.2 filed Oct. 26, 2007, the contents of which are hereby incorporated by reference in their entirety.

TECHNICAL FIELD

The invention relates to a method for generating signals for manipulating the movement of a vehicle body of a motor vehicle controllable or adjustable with respect to its movement processes, wherein the movement of the vehicle body is detected by means of sensors, the sensor signals corresponding to the detected sensor values are fed to a shock absorber control unit, the shock absorber control unit provides at least one control signal for controlling actuators, in particular semi-active or active shock absorbers by means of which the movement of the vehicle body may be manipulated. The invention further relates to a system for implementing the method and a vehicle, in particular a motor vehicle, comprising a system for manipulating the movement of a vehicle body controllable or adjustable with respect to its movement processes.

BACKGROUND

Methods and systems of like kind are well-established. For example, known from DE 39 18 735 A1 are a method and a device for attenuating movement processes at chassis suspensions of passenger and utility motor vehicles, in which from a movement of two vehicle masses detected by means of sensors a control signal is generated by means of a signal processing circuit for a controllable actuator actuating at the vehicle masses. In order to achieve a comfortable and nevertheless safe chassis suspension setting it is provided for to guide the signals detected by means of sensors via a circuit device being associated to the signal processing circuit and comprising a frequency dependent transfer behavior. Hereby it is to be achieved that due to the frequency dependent processing of the sensor signals no static characteristic curve is applied for controlling the actuator and adjusting the actuator, respectively, but an actuator control and actuator adjustment, respectively, is carried out depending on the frequency content of the movement process. Hereby, the goal of a preferably high driving comfort is to be achieved together with a safe design of the chassis suspension also in the limit range of the driving condition. The basis for this approach is the idea that the conflict of objectives between desired driving comfort, this is to mean comfortable and soft design, and driving dynamics, this is to mean a sportive and firm adjustment on the one hand and a sufficient driving safety on the other hand, is to be matched. Crucial for driving comfort and driving dynamics is a damping of the movement of the body, whereas a wheel load and a wheel load variation, respectively, is crucial for a driving safety.

Substantially, three shock absorber systems are known for vehicles, wherein an actuator is arranged in parallel to a spring assembly between wheel and body. Passive, semi-active and active shock absorber systems are known in the art. In passive shock absorber systems a modification of the shock absorber force during the driving operation is not arranged for. In semi-active shock absorber systems the shock absorber force may be modified by means of a modification of an oil fluid stream using one or several valves. In this way the shock absorbing characteristics may be modified. Semi-active shock absorber systems strictly operate in an energy absorbing way. In active shock absorber systems a desired shock absorber force may be provided in a stabilizing as well as an energy delivering way in each direction.

With the known methods and systems for manipulating the movement of the chassis suspension it is unfavorable that as an output of the control unit modules used a force is required. This features the disadvantage that in addition a shock absorber velocity is required as an additional parameter in order to yield the ultimate control parameter, the control current, by means of a characteristic diagram conversion. Furthermore, also during a constant force requirement the current may change depending on the shock absorber velocity. Since a characteristic diagram conversion is prone to error also the resulting shock absorber force is going to become correspondingly discontinuous. This is especially unfavorable in the range of low shock absorber velocities which in particular often are present in lateral dynamics instances because here the largest nonlinearities and inaccuracies in the characteristic diagram exist. Furthermore it is known in the art that the shock absorber as a general rule is set soft in the velocity zero crossing in the characteristic diagram. Especially with shock absorber velocities which oscillate around zero a continuously oscillating current is then provided in the case of a constant force requirement which is counterproductive to the proper adjustment.

SUMMARY

According to various embodiments, a method and a system of a like kind can be provided by means of which an adjustment of the movement of a vehicle body is feasible in a simple and safe manner using electronically controllable actuators (shock absorbers) and at the same time solving the conflict of objectives between driving comfort, driving dynamics and driving safety.

According to an embodiment, in a method for generating signals for manipulating the movement of a vehicle body of a motor vehicle controllable or adjustable with respect to its movement processes, the movement of the vehicle body is detected by means of sensors, the sensor signals corresponding to the detected sensor values are fed to a shock absorber control unit, and the shock absorber control unit provides at least one control signal for controlling actuators, in particular semi-active or active shock absorbers, by means of which the movement of the vehicle body may be manipulated, wherein by means of status dependent control algorithms the at least one control signal for controlling the actuators is determined from the sensor signals in consideration of the current and/or anticipated conditions depending on selectable requirements for the movement of the vehicle body and driving safety requirements.

According to a further embodiment, a control current directly manipulating the actuators can be provided as the at least one control signal. According to a further embodiment, as selectable requirements for the movement of the vehicle body it may at least be selected between comfort and sportiness. According to a further embodiment, the selection may be carried out continuously variable or in steps between high comfort and high sportiness. According to a further embodiment, driving conditions and/or loading conditions and/or energy states and/or driver activities can be allowed for in the detection of the at least one control signal. According to a further embodiment, as the driving conditions the vertical dynamics and/or the longitudinal dynamics and/or the lateral dynamics of the vehicle can be allowed for. According to a further embodiment, as the energy states the energy states of the body and/or of the wheel and/or of the roadway and/or of the actuators are allowed for. According to a further embodiment, as the driver activity the actuation state of the accelerator pedal and/or of the brake pedal and/or of the steering and/or of the gearbox is allowed for. According to a further embodiment, a convenience requirement can be realized in the control algorithms in particular by means of the utilization of at least one status dependent filter and/or at least one status dependent vertical dynamics module for the individual wheel movement and/or the overall movement of the body (lift, vehicle roll and pitch) and/or at least one status dependent end position module, in particular in consideration of the energy states of body, shock absorber, wheel and/or roadway. According to a further embodiment, the demand of sportiness and/or the demand of driving safety is realized for quasi-stationary and for dynamic processes in the control algorithms in particular by means of the utilization of status dependent filters and status dependent longitudinal and lateral dynamics modules, in particular in consideration of the energy states of body, shock absorber, wheel and/or roadway. According to a further embodiment, the status dependent control algorithms may be carried out separately or in combination by the conditions and requirements. According to a further embodiment, the code of the adjustment algorithms can be executed in the shock absorber control unit using different time patterns, wherein at least one fast pattern comprising a time pattern between 0.5 ms and 5 ms, preferably a 1 ms pattern and a 5 ms pattern, and at least one slower pattern comprising a time pattern >5 ms, preferably a 10 ms pattern and a 100 ms pattern, exist. According to a further embodiment, the status dependent control algorithms may allow for superordinate messages. According to a further embodiment, diagnosis signals and/or substitution value signals and/or emergency operation signals may be allowed for as superordinate messages.

According to another embodiment, a system for manipulating the movement of a vehicle body of a motor vehicle controllable or adjustable in its movement processes, may comprise sensors which detect the movement of the vehicle body, comprising controllable or adjustable actuators, in particular semi-active or active shock absorbers, which are arranged between the vehicle body and the vehicle wheels, comprising a shock absorber control unit by means of which the sensor signals are processed and at least one control signal is provided for the actuators, characterized in that the shock absorber control unit and/or a control device comprises modules by means of which at least one control signal for the actuators may be generated from the sensor signals in consideration of current and/or anticipated conditions depending on selectable requirements for the movement of the vehicle body and driving safety requirements.

BRIEF DESCRIPTION OF THE DRAWINGS

In the following the invention is described by way of exemplary embodiments with the help of associated drawings, in which.

DETAILED DESCRIPTION

Figure 1:
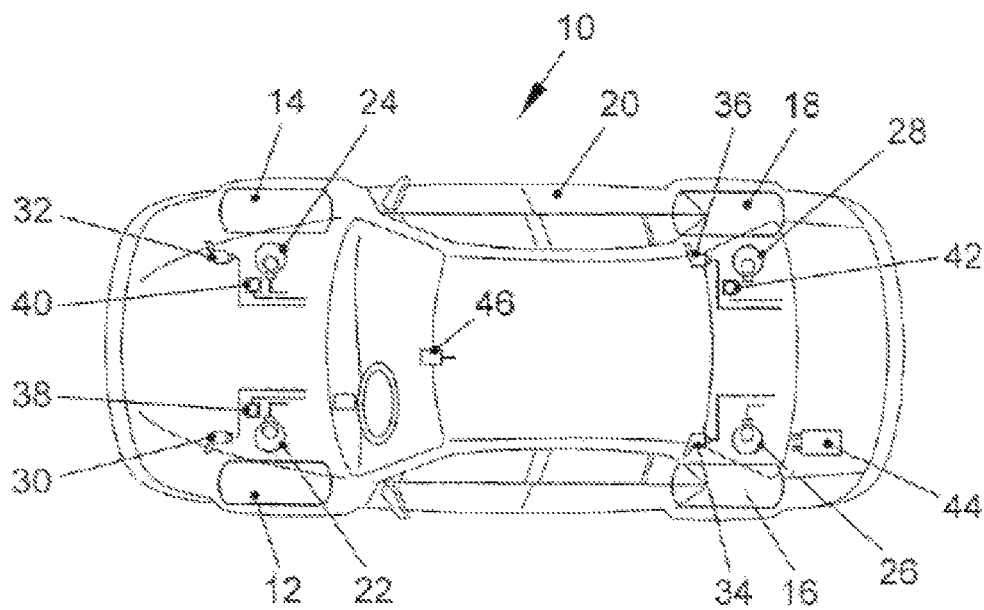
FIG. 1 schematically shows a motor vehicle comprising a shock absorber control system.

Thus that by means of the shock absorber control units the at least one control signal for controlling the actuators is determined from the sensor signals in consideration of the current and/or anticipated conditions, depending on selectable requirements for the movement of the vehicle body and driving safety requirements, and by means of status dependent control algorithms, it is favorably feasible to vastly solve the conflict of objectives between driving comfort and driving dynamics on the one hand and driving safety on the other hand by means of the specific involvement of the status dependent control algorithms. By considering the current and/or anticipated conditions in the provision of the control signals for the actuators, this is to mean in the setting of the damping of the movement of the vehicle body, besides the comfort requirements of a vehicle driver also the dynamic driving conditions of the vehicle are considered in particular also in consideration of safety critical conditions.

In an embodiment it is provided for that a control current directly manipulating the actuators is provided as the at least one control signal. Hereby, on the one hand the requirement for the provision of a shock absorber velocity as an additional parameter is omitted and on the other hand the characteristic diagram conversion into the actual control parameter known in the art is not anymore required.

In a further embodiment it is provided for that as a selectable requirement for the movement of the vehicle body it may at least be selected between comfort and sportiness, wherein in particular the selection is carried out continuously variable and/or in steps between high comfort and high sportiness. Hereby, in a simple manner an adaptation of the manipulation of the movement of the vehicle body to the individual requirements of a vehicle driver is feasible.

Furthermore, in a embodiment it is provided for that in the detection of the at least one control signal driving conditions and/or loading conditions and/or energy states and/or driver activities are accounted for as current and/or anticipated conditions. Hereby, as driving conditions the vertical dynamics and/or the longitudinal dynamics and/or the lateral dynamics of the vehicle may be accounted for very favorably. Furthermore, the energy states of the body and/or the wheels and/or the roadway and/or the actuators may very favorably be accounted for as the energy states. Further, the actuation state of the accelerator pedal and/or the brake pedal and/or the steering and/or the gear shift may favorably be accounted for as the driver activities. A control signal determined from these possible conditions separately or in any combination thereof leads to a convenient adaptation of the movement of the vehicle body to the requirements effectively provided by the vehicle driver. All in all, thus a very harmonious movement activity of the vehicle body may be adjusted which is sensed to be convenient and comfortable by the vehicle driver and the vehicle passengers, respectively.

Furthermore, it is provided for in an embodiment that a convenience requirement is realized in the control algorithms, in particular by using at least one status dependent filter and/or at least one status dependent vertical dynamics module for the single wheel movement and/or the overall movement of the body (lift, vehicle roll and pitch) and/or at least one status dependent end position module, in particular in consideration of the energy states of body, shock absorber, wheel and/or roadway. Hereby, favorably a very fine adjustment of the movement of the body is feasible accommodating the desired convenience requirement and accounting for the given and anticipated conditions, respectively.

Further, it is provided for in an embodiment that a requirement related to sportiness and/or driving safety is realized in the control algorithms, in particular by using status dependent filters and status dependent longitudinal and lateral dynamics modules for quasi-stationary and for dynamic activities, in particular in consideration of the energy states of body, shock absorber, wheel and/or roadway. Also hereby the requirements of the vehicle driver are accounted for in a very favorable manner with respect to a sportive shock absorber adjustment, wherein driving conditions relevant to security are accounted for. Thus, a vehicle driver may comply with his desired sportive driving style without additional situations relevant to security being caused thereby.

Further, it is preferably provided for that the status dependent control algorithms may be carried out separately or in combination by the conditions and requirements. Hereby, favorably an adjustment of the damping of the movement of the vehicle body by means of all possible factors, also perturbations, becomes feasible.

In a further embodiment it is provided for that the status dependent control algorithms take into account superordinate messages, wherein preferably diagnosis signals and/or substitution value signals and/or emergency operation signals are taken into account as superordinate messages. Hereby, error state conditions are accounted for in the detection of the control signals for controlling the actuators and the detection of the control signals in the shock absorber control unit are adjusted by the status dependent control algorithms insofar as that the minimum required adjustment goals are achieved despite potential error state conditions. In particular, despite the occurrence of a error the shock absorber control according to the requirements and the given and anticipated conditions, respectively, may be maintained until an elimination of the error by means of the provision of substitution values or emergency functions insofar as that the vehicle may be further driven without limitation or when indicated with limited convenience. Thus, convenience losses for the vehicle driver and the vehicle passengers, respectively, are widely avoided despite errors that have occurred.

Furthermore, it is provided for in an embodiment that the diagnosis signals, substitution value signals and/or emergency operation signals are automatically prompted and/or generated by the status dependent control algorithms, wherein preferably identification signals and/or status signals of a functional software executing the control algorithms and/or of a basic software dedicated in a subordinate or in a parallel manner are accounted for. The diagnosis preferably comprises the sensors and/or the actuators and/or the control means of the actuators, that is to say the components involved in manipulating the movement of the vehicle body. Hereby it is assured that in the case of an actual occurrence of a error the manipulating movement of the vehicle body preferably may be effected close to the desired movement until the elimination of the error is carried out and is feasible, respectively.

The goal is further reached according to various embodiments by means of a system for manipulating the movement of a vehicle body of a motor vehicle controllable or adjustable with respect to its movement processes and comprising sensors which detect the movement of the vehicle body, by means of controllable or adjustable actuators, in particular semi-active or active shock absorbers which are arranged between the vehicle body and the vehicle wheels, using a shock absorber control unit, by means of which the sensor signals are processed and at least one control signal for the actuators is provided, wherein the shock absorber control unit and/or a control device comprises modules by means of which at least one control signal for the actuators may be generated from the sensor signals in consideration of current and/or anticipated conditions, depending on selectable requirements for the movement of the vehicle body and driving safety requirements.

Preferably it is provided for that the shock absorber control unit comprises an input interface, a signal input module, a control unit module, a signal output module and an output interface. Hereby, when indicated, a hierarchically organized detection of the control signals for the actuators may be implemented in a simple manner. Preferably the signal output module comprises a current calculating module, by means of which by the use of the shock absorber control unit the provision of a current signal directly actuating the control means of the actuators becomes feasible. According to functional and/or hierarchical aspects an allocation of separate partial modules is variably feasible within the modular structure of the shock absorber control unit.

Furthermore, the signal input module according to various embodiments comprises a filtering module, a man-machine-interface module, a load recognition module and an error management module.

According to various embodiments, the adjustment module comprises a roadway recognition module, an end position shock absorbing module, a lateral dynamics module, a longitudinal dynamics module and a vertical dynamics module.

According to various embodiments, the error management module comprises a diagnosis module, a substitution value concept module and an adjustment emergency operation status module.

According to various embodiments, the signal output module comprises a current calculating module. According to various embodiments, a vehicle, in particular a motor vehicle comprising a system for manipulating the movement of a vehicle body controllable or adjustable with respect to its movement processes, is provided according to at least one of the specified characteristics.

FIG. 1 in top view schematically shows a motor vehicle indicated by reference numeral 10. Body and function of motor vehicles are commonly known, so that these are not further described within the framework of the present description.

Motor vehicle 10 comprises four wheels 12, 14, 16 and 18. The wheels 12, 14, 16 and 18 are mounted to a body 20 of the motor vehicle 10 by means of a well-known wheel suspension. Within the framework of the various embodiments body 20 in general is considered to be the vehicle carriage comprising the passenger compartment. Between each of the wheels 12, 14, 16 and 18 on the one hand and the body 20 on the other hand a shock absorber 22, 24, 26 and 28 is arranged, respectively. The shock absorbers 22, 24, 26 and 28 are arranged in parallel to springs (not shown). The shock absorbers 22, 24, 26 and 28 for example are formed as semi-active shock absorbers, this is to say the shock absorber force may be varied by applying a control signal to a control means of the shock absorbers. The control means generally is formed as a electromagnetic valve so that the control signal is a control current for the valve.

To each wheel and to each shock absorber, respectively, a path sensor 30, 32, 34 and 36, respectively, is assigned. These are formed as relative path sensors, this is to say they measure a modification of the distance of the body 20 to the respective wheel 12, 14, 16 and 18, respectively. Typically, so called rotation angle path sensors are used here, the assembly and function of which is generally well-known.

Body 20 further comprises three vertical acceleration sensors 38, 40 and 42 arranged at selected positions. These acceleration sensors 38, 40 and 42 are fixedly arranged at the body 20 and measure the vertical acceleration of the body in the area of the wheels 12, 14 and 18, respectively. In the area of the left rear wheel 16 the acceleration may be calculated from the three other acceleration sensors so that here the arrangement of a dedicated acceleration sensor may be omitted.

The arrangement of the sensors is merely by way of example. Also different sensor arrangements may be used, for example a vertical body acceleration sensor and two rotation angle sensors or the like.

Motor vehicle 10 further comprises a control device 44 which is connected to the control means of the shock absorbers 22, 24, 26 and 28, the path sensors 30, 32, 34 and 36 and the acceleration sensors 38, 40 and 42 by means of signal and control lines, respectively. Control device 44 assumes the shock absorber control to be described in more detail in the following. Alongside, the control device 44 of course may also assume further functions within the motor vehicle 10 not to be considered here. Motor vehicle 10 further comprises a switching means 46, for example a push-button, a rotating wheel or the like, by means of which a requirement for the movement of the body 20 may be selected by a vehicle driver. Here, it may for example be selected between the requirement "comfort", the requirement "sport" and the requirement "basic". The selection between the three modes may either be effected in steps or continuously variable comprising respective intermediate modes.

The switching means 46 is connected to the control device 44 as well.

Figure 2:
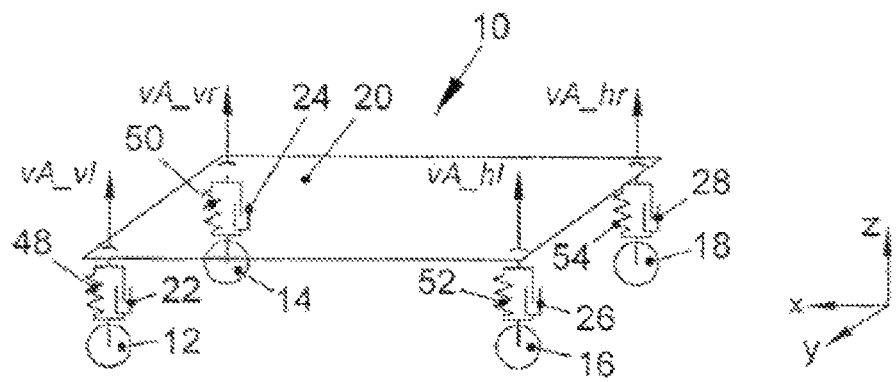
FIG. 2 shows a schematic diagram of a motor vehicle comprising vertical body corner velocities.

FIG. 2 shows a schematic diagram of the motor vehicle 10, wherein here the body 20 is denoted as a flat surface. At each of the corners of the body 20 the wheels 12, 14, 16 and 18 are arranged in a well-known manner via a combination of spring and shock absorber. The combination of spring with shock absorber consists of the shock absorbers 22, 24, 26 and 28 and in each case springs 48, 50, 52 and 54 arranged in parallel. Arranged at the corners of the body 20 are the acceleration sensors 38, 40 and 42, respectively, as shown in FIG. 1, by means of which the vertical velocity at the corners of the body 20 can be determined These are the velocities vA_vl (velocity at body front left), vA_vr (velocity at body front right), vA_hl (velocity at body rear left) and vA_hr (velocity at body rear right). The velocity can be calculated by integrating the accelerations measured by means of the acceleration sensors.

Figure 3:
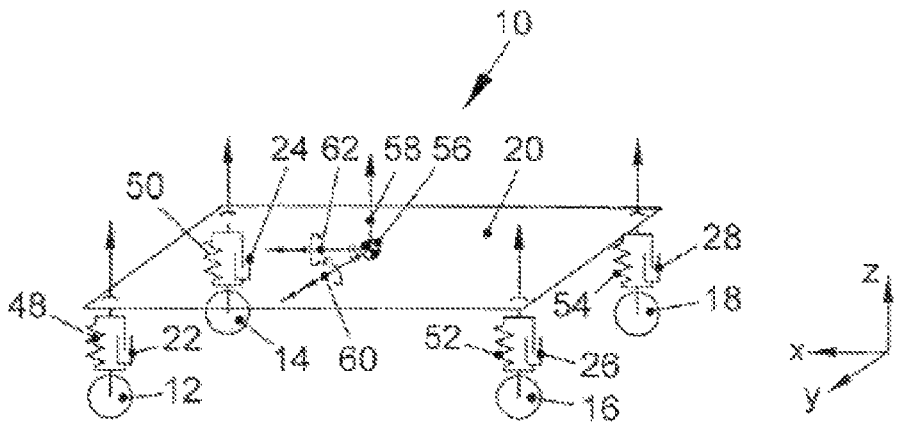
FIG. 3 shows a schematic diagram of a motor vehicle comprising vertical modal body velocities.

FIG. 3 again shows the schematic diagram of motor vehicle 10, wherein like parts are denoted with like reference numerals as in the preceding Figures and are not described again. In a center of gravity 56 the modal movements of the body 20 are emphasized. On the one hand this is a lift 58 in vertical direction (z direction), on the other hand a pitch 61, this is to say a rotational movement around a transverse axis positioned in the y axis, and a vehicle roll 63, this is to say a rotational movement around a longitudinal axis positioned in the x axis of the motor vehicle 10.

Figure 4:
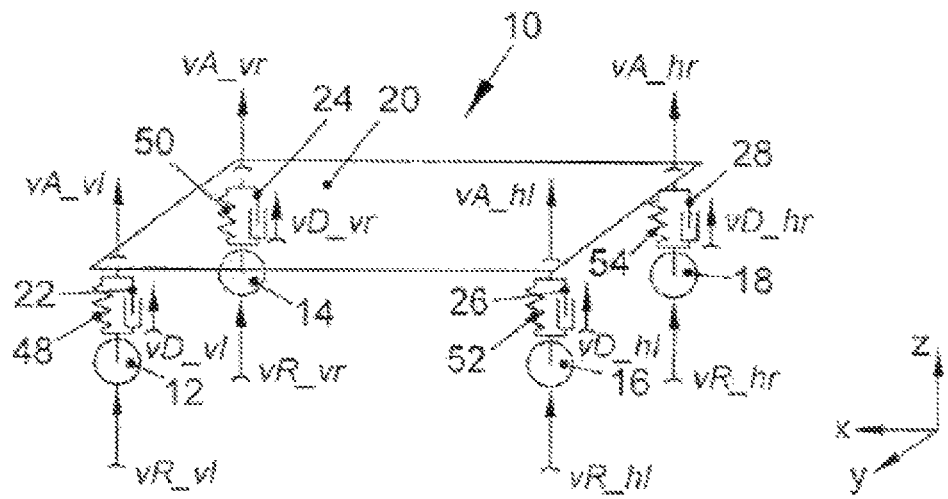
FIG. 4 shows a schematic diagram of a motor vehicle comprising sensors arranged in the shock absorber system and the resulting wheel, body and shock absorber velocities.

FIG. 4 shows a further schematic diagram of the motor vehicle 10, wherein here, as a supplement to the illustrations in FIG. 2, further signals are depicted. In addition the shock absorber velocities vD are illustrated here, wherein vD_vl is the shock absorber velocity of the shock absorber 22 (front left), vD_vr is the shock absorber velocity of the shock absorber 24 (front right), vD_hl is the shock absorber velocity of the shock absorber 26 (rear left) and vD_hr is the shock absorber velocity of the shock absorber 28 (rear right). The shock absorber velocities can be determined from the signals of the path sensors 30, 32, 34 and 36 (FIG. 1), respectively, via a differentiation. Denoted in FIG. 4 further are the wheel velocities vR. Here, velocity vR_vl represents the wheel 12 (front left), vR_vr represents the wheel 14 (front right), vR_hl represents the wheel 16 (rear left) and vR_hr represents the wheel 18 (rear right). These wheel velocities vR may for example be determined using wheel acceleration sensors.

Since the body velocities vA, the shock absorber velocities vD as well as the wheel velocities vR all have the same directional vector (in direction z), the correlation vD=vA−vR consists. Hereby not all of the measurement parameters have to be present in the form of measurement signals, but can be calculated form the other measurement parameters.

Figure 5:
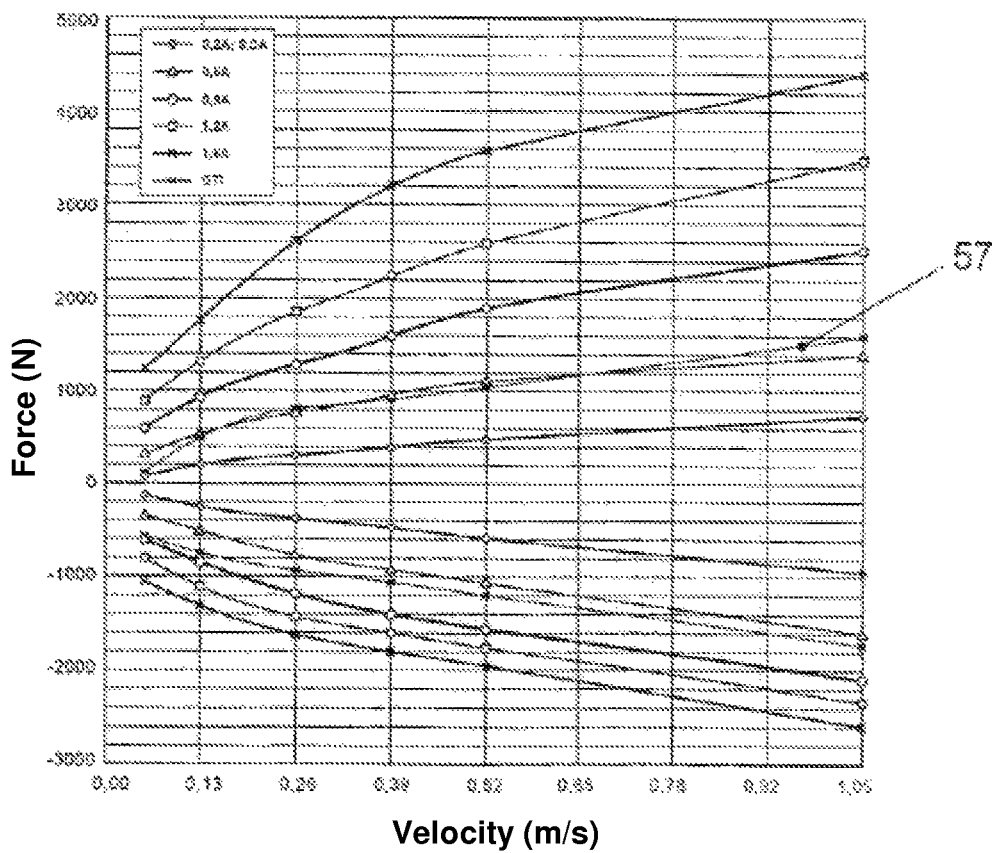
FIG. 5 shows an exemplary characteristic diagram of a controlled shock absorber.

As an example, illustrated in FIG. 5 is a force-velocity characteristic diagram of a controlled shock absorber. Assembly and function of controlled shock absorbers in general are well-known so that these are not described in more detail within the framework of the present description. Used here are either semi-active shock absorbers or active shock absorbers. It is essential that the shock absorber force can be adjusted by means of a manipulation of the shock absorber velocity. The shock absorber force acts in parallel to the forces of the springs (see FIGS. 2 to 4), so that thereby the movement of the body 20 can be affected with respect to its movement processes. In order to manipulate the shock absorber velocity arranged at the shock absorbers is a electromagnetic valve or another applicable valve, which manipulates a flow rate cross section for a medium, in particular a hydraulic oil, by applying a respective control current. The exemplary characteristic diagram illustrated in FIG. 5 shows different characteristic curves, wherein the shock absorber force is plotted in Newton against the shock absorber velocity vD in mm/s for different control currents. The shock absorbers have a large spread, this is to say depending on the control current applied large variations between the shock absorber velocities and the shock absorber force can be adjusted. For clarification a characteristic curve 57 is plotted which would correspond to a passive shock absorber. Only by means of this large spread of the shock absorber an effective adjustment becomes feasible, wherein a soft characteristic value should be positioned below the passive characteristic curve 57 and a hard characteristic value should be positioned notedly above the characteristic curve 57. Also it becomes clear the already large spread at low shock absorber velocities vD as well as the substantially linear course of the current curves in the characteristic diagram.

It becomes clear from the description given so far that it depends on the provision of a control current for the control means of the shock absorbers to reach an effective adjustment of the movement process of the body. In the following the provision of this control current is described in more detail in consideration of the implementation of the solutions according to various embodiments.

Figure 6:
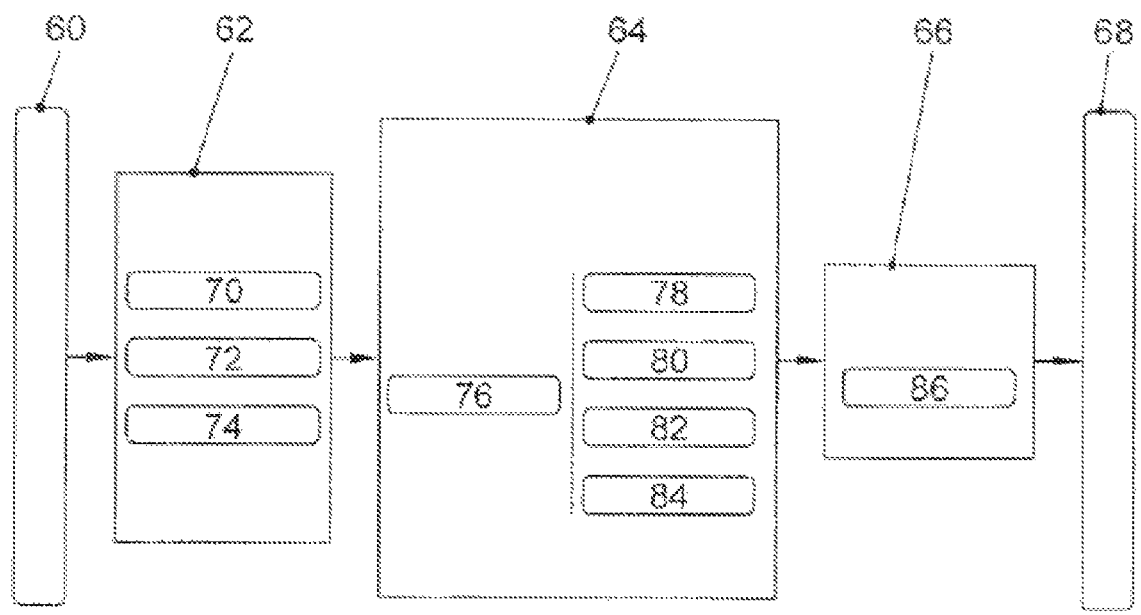
FIG. 6 shows a coarse structure of the function modules of a shock absorber control system.

FIG. 6 in a block diagram shows a coarse structure of the function modules for the shock absorber control according to various embodiments. For reasons of clarity and comprehensibility the separate modules are shown enclosed. The overall structure favorably is hierarchically designed across several levels. The function modules are integrated into a shock absorber control unit, preferably the control device 44 (FIG. 1). The shock absorber control system comprises a signal input module 60, a help function module 62, a control unit module 64, a evaluation module 66 and a signal output module 68. Read into the signal input module 60 are the sensor signals of the path sensors 30, 32, 34 and 36, respectively, and of the acceleration sensors 38, 40 and 42 as well as further signals provided via the CAN bus of the motor vehicle. The help function module 62 comprise a man-machine-interface module 70, a filtering module 72 and a load recognition module 74.

The control unit module 64 comprises a roadway recognition module 76, a end position shock absorbing module 78, a lateral dynamics module 80, a longitudinal dynamics module 82 as well as a vertical dynamics module 84. The evaluation logics module 66 comprises a current calculating module 86. The control unit modules 76, 78, 80, 82 and 84 favorably generate a current, or a parameter, which is proportional to the current. Taking place in the current calculating module 86 is the current calculation of all control unit output parameters into control parameters for the shock absorbers 22, 24, 26 and 28, respectively. By means of the signal output module 68 these control currents are provided to the shock absorbers. Depending on the equipment of the respective motor vehicle the signal input module 60 as well as the signal output module 68 optionally may of course also receive further signals and may output these signals, respectively.

Figure 7:
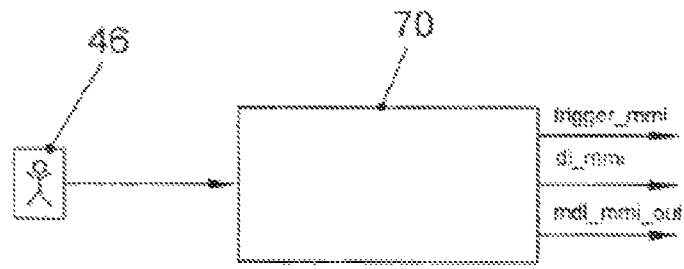
FIGS. 7 to 14 show schematic block diagrams of separate control modules.

FIG. 7 shows a schematic block diagram of the man-machine-interface module 70. By means of the switching means 46 the vehicle driver can select a mode. This for example is the mode "comfort", the mode "sport" or the mode "normal". The module 70 calculates a current di_mmi for mode switching with the objective of sensibilizing the vehicle driver and co-drivers to the modified comfort characteristics during a change of the driving mode. Furthermore, a trigger vector trigger_mmi represents the status of all three possible driving modes. This trigger vector may then be used as a switching signal in the further modules. Further, a signal mdl_mmi_out outputs the currently selected driving mode.

Figure 8:
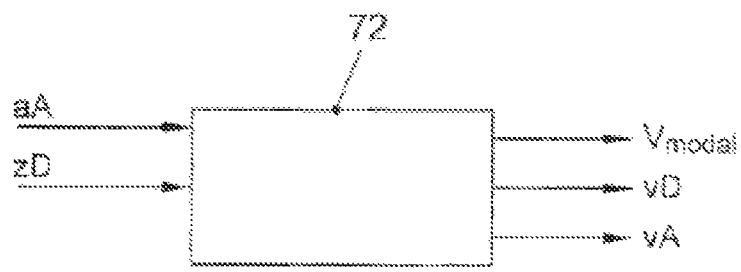

FIG. 8 shows a schematic block diagram of the filtering module 72. On the one hand, applied to the filtering module 72 are the measurement values aA supplied by the body acceleration sensors 38, 40 and 42 (FIG. 1) and the signals zD supplied by the relative path sensors 30, 32, 34 and 36. Calculated from these input parameters are the body velocities vA at the corners of the body 20 by means of the filtering module 72. Further, the shock absorber velocities vD at the corners of the body 20 are determined. Furthermore, the modal body velocities vModal for pitch and vehicle roll are calculated. Primarily, the body velocities vA at the corners of the body 20 serve as input parameters for the single wheel control in the vertical control module 84. The modal body velocities vModal are required for an additional damping of pitch and vehicle roll movements of the body 20 in the modal control in the vertical control module 84.

Figure 9:
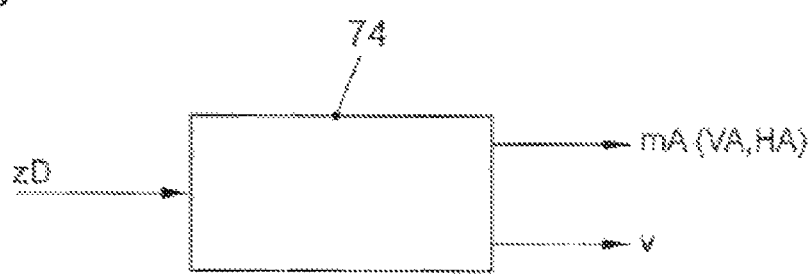

FIG. 9 shows a schematic block diagram of the load recognition module 74. From the signal zD provided by the relative path sensors 30, 32, 34, 36 and applied to the input the body masses mA at the front axle VA and the rear axle HA are generated. Furthermore, amplification factors V for adjusting the mass distribution are determined.

Figure 10:
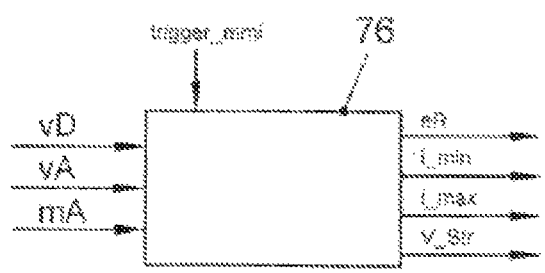

FIG. 10 shows a schematic block diagram of the roadway recognition module 76. By means of this module 76 a calculation of the roadway quality as an energetic status is carried out. Applied to the input of module 76 are the relative velocities body/wheel vD provided by the filtering module 72 as well as the body velocities vA and the axle load distribution mA provided by module 74. In addition, the signal Trigger_mmi from module 70 is applied as a status of the driving modes. The module 76 provides signals to take into account the current roadway condition (even/uneven) within the shock absorber control system. For this, energetic roadway condition parameters eR (energy wheel) are determined in module 76 and displayed together with respective amplification factors for downstream modules. Furthermore, minimum and maximum current limits are generated so that a wheel hop due to over-damping or under-damping may be omitted effectively.

Figure 11:
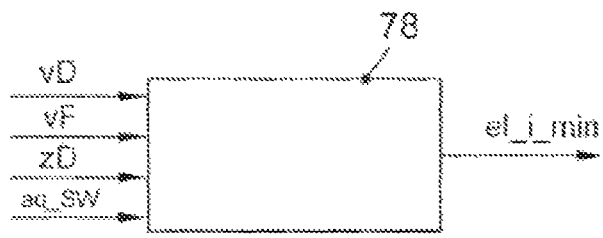

FIG. 11 shows a schematic block diagram of the end position shock absorbing module 78. As input signals the relative velocities vD of body/wheel of module 72 as well as the signals zD of the relative path sensors 30, 32, 34 and 36 are applied to module 78. Further, the vehicle velocity vF and a switching signal aq (On/Off) from the lateral dynamics module 80 (FIG. 13) are processed. From these signals shock absorber currents el_i_min are calculated for each of the shock absorbers 22, 24, 26 and 28, respectively. An electronic wheel selective end position damping is realized using these shock absorber currents.

Figure 12:
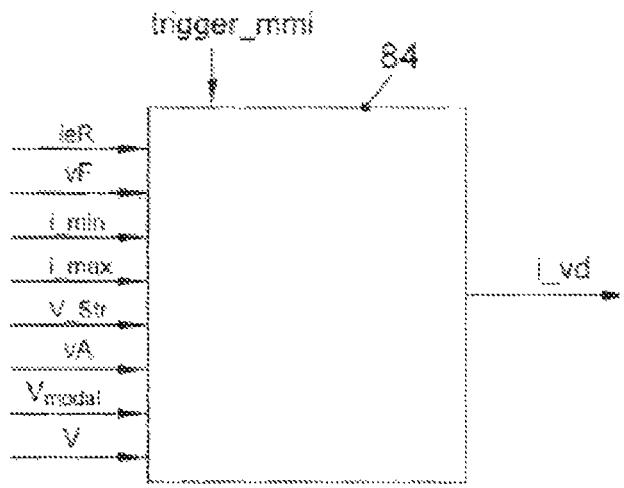

FIG. 12 shows a schematic block diagram of the vertical dynamics module 84. Applied as input signals to the module 84 are the energetic roadway condition signal eR delivered by module 76, eA as well as the respective amplification factors v-str and the Min and Max current signals i_min, i_max of module 76. Further applied are the vehicle speed vF, the body velocities vA from module 72, the vehicle roll and pitch velocities vModal from module 72 and the amplification factors V of the body masses from module 74. Further, the status of the driving modes is provided by means of the signal trigger_mmi. Module 84 comprises a mode dependent adjustment of the vertical dynamic comfort characteristics and therewith a core function of the shock absorber control system. It is the object of this vertical control module 84 to initially control each of the corners of the body 20 separately by means of the function "individual wheel control" to thus decouple the body 20 as far as possible from the roadway stimulus. By means of a function "modal control" the modal movements pitch, vehicle roll and lift (FIG. 3) coupled via the body 20 are directly affected. The module 84 provides a control current i_vd for vertical damping.

Figure 13:
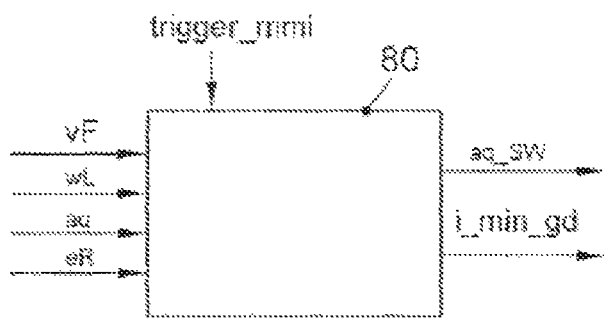

FIG. 13 shows a schematic block diagram of the lateral dynamics module 80. Applied as input signals are the vehicle speed vF, a steering wheel angle signal wL, a lateral acceleration signal and a roadway recognition signal from the module 76. Furthermore, the status signal of the driving modes, trigger_mmi, is provided. Calculated by means of the module 80 each are currents imin_qd for the shock absorbers 22, 24, 26 and 28 for manipulating the lateral vehicle dynamics. Hereby, for example the vehicle roll movement of the body 20 due to lateral accelerations, for example during driving through curves, lane changes or the like, are reduced. Further, the inherent steering behavior of the motor vehicle 10 thereby may be affected by means of selective vehicle roll moment distributions at the front axle and the rear axle. Further, the roadway condition is allowed for by means of comprehension of the kinetic wheel-body-energies. The lateral control module 80 further provides a switching signal aq_SW (On/Off) by means of which other modules, in particular comfort oriented modules, may be activated and de-activated, respectively. Hereby it can be achieved that the comfort controls may be de-activated momentarily during a lateral dynamic adjustment in order to master security relevant situations.

Figure 14:
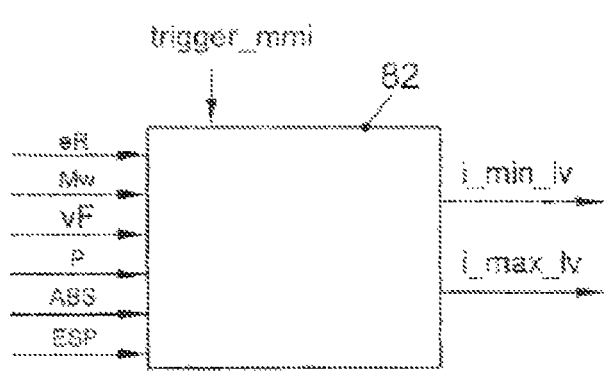

FIG. 14 shows a schematic block diagram of the longitudinal dynamics module 82. Applied as input signals to module 82 are the roadway recognition signal eR of module 76, a driver desired moment Mw, the vehicle speed vF, a braking pressure P as well as signals provided by the anti-lock braking intervention and the ESP intervention. Furthermore, the signal trigger_mmi for the current status of the driving modes is provided. The longitudinal dynamics module 82 calculates shock absorber currents i.min_LV and i.max_LV for the shock absorbers 22, 24, 26 and 28 in order to reduce pitch processes during braking and acceleration actions. At the same time security relevant interventions concerning the driving dynamics are allowed for by the ESP system or the anti-lock braking system.

The allocation of the separate modules 70, 72, 74, 76, 78, 80, 82, 84, 86 to the main modules 62, 64, 66 described according to FIGS. 6 to 14 merely is by way of example. Other applicable allocations within the shock absorber control unit are feasible.

Figure 15:
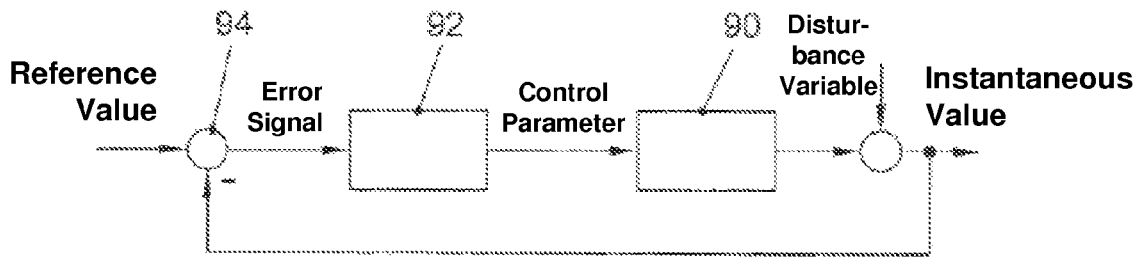
FIG. 15 shows a block diagram of a common control loop.

Illustrated in FIG. 15 is a common control loop. This is comprised of a section 90, a control unit 92 and a negative feedback of the control parameter, this is to say the instantaneous value of the control unit 92. The error signal is calculated from the difference between the reference value (set point) and the control parameter. The control parameter takes affects the section 90 and thereby the control parameter. The disturbance variable causes a normally undesired modification of the control parameter which has to be compensated. The input parameter of the control unit 92 is the difference between the measured instantaneous value of the control parameter and the reference value. The reference value is also denoted as the set point whose value is to be reproduced by the measured instantaneous value. Since the instantaneous value may be modified by disturbance variables the instantaneous value has to be made to follow the reference value. A deviation of the instantaneous value from the reference value determined in a comparator 94, the so called error signal, serves as an input parameter for the control unit 92. By means of the control unit 92 it is defined how the control system reacts to the deviations detected, for example fast, slow, proportional, integrating or the like. As an output parameter of the control unit 92 results a control parameter which exerts influence on a closed loop controlled system 90. The closed-loop control mainly serves to eliminate disturbance variables by compensating these.

Figure 16:
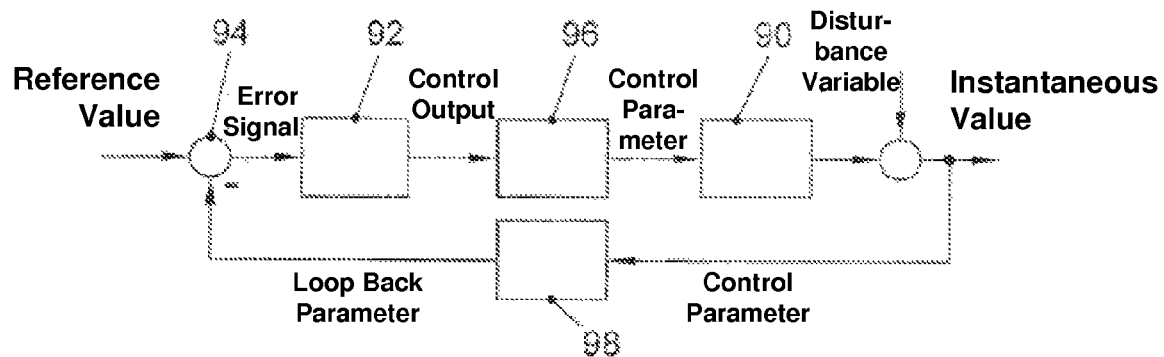
FIG. 16 shows a block diagram of an extended control loop.

Depicted in FIG. 16 is a detailed illustration of the control loop according to FIG. 15. Shown is an enhanced control loop comprising the additional elements control element 96 and measuring element 98. In the example of the shock absorber control system according to various embodiments the control device and the control element 96, respectively, is comprised of an electronic component and an electro-hydraulic component. The electronic component corresponds to the current control system in the control device 44, while the electro-hydraulic component corresponds to the electrically controllable valve of the shock absorber 22, 24, 26 and 28, respectively. However, throughout the following description these are not to be contemplated further. They are considered to be ideal and their effect is disregarded, respectively. Hence, idealized the control unit output providing the control factor conforms to or is proportional to the control parameter. The control unit 92 according to FIG. 15 in this connection is divided into the actual control unit 92 and the control element 96. The control unit 92 serves to determine a parameter by means of which it is to be responded via the control element 96 to an error signal determined by the comparator 94. The control element 96 provides the required energy in the suitable physical form in order to affect the process and the closed loop controlled system, respectively. Measured in the measuring element 98 is the instantaneous value. During an adjustment of the movement of a vehicle body 20 the disturbance variable may be caused by an unevenness of the roadway, laterally acting forces, as for example wind or the like, or similar influences.

Figure 17:
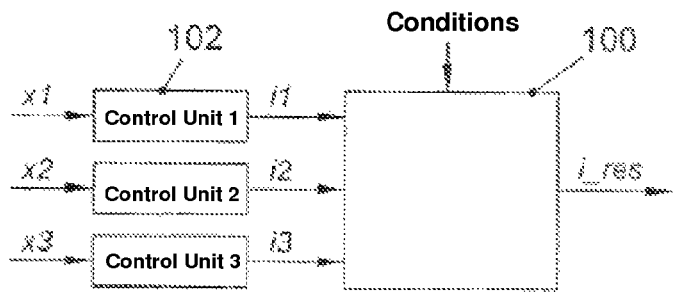
FIG. 17 shows a schematic diagram of a combination unit for detecting a resulting current using conditions/condition parameters.

With respect to the generally well-known mode of operation according to the control unit structures described in FIGS. 15 and 16, FIG. 17 shows one possibility for calculating the current in the current calculating module 86. In a combination unit 100 for detecting a resulting current i_res the latter is determined from the different input currents i1, i2, i3 provided by individual control units 102 using conditions/condition parameters. In this connection, the input currents i may be the currents provided by the adjustment modules 76, 78, 80, 82 and 84, respectively. The resulting current i_res then is the control current for the shock absorbers.

In the current calculating module 86 these setpoint currents are generated for use by the basic software. They are forwarded to the interface (signal output module 68). The basic software applies these setpoint currents to the shock absorbers by means of the current controller, for example a two-level controller or a PID-control unit comprising PWM-control. It is controlled corresponding to the predetermined setpoint current.

Figure 18:
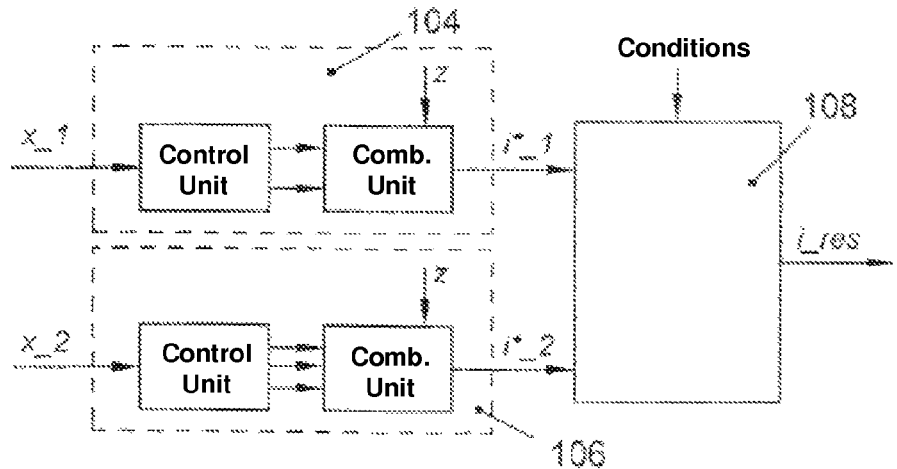
FIG. 18 shows a schematic diagram of a segmentation of a combination unit into module elements and an overall element.

According to the embodiment illustrated in FIG. 18 the current calculating module 86 may also comprise a segmentation into module elements and an overall element. In this connection, for example module elements 104 and 106 are provided which each comprise a control module and a combination unit. In consideration of state variables control unit output currents i*_1 and i*_2, respectively, are already provided by these modules. The combination unit 108 evaluates the control unit output parameters from the modules 104 and 106, as for example the roadway recognition module 76, the end position shock absorbing module 78, the lateral dynamics module 80, the longitudinal dynamics module 82 and the vertical dynamics module 84, in order to output the shock absorber setpoint currents i_res suited best for the current driving condition.

Figure 19:
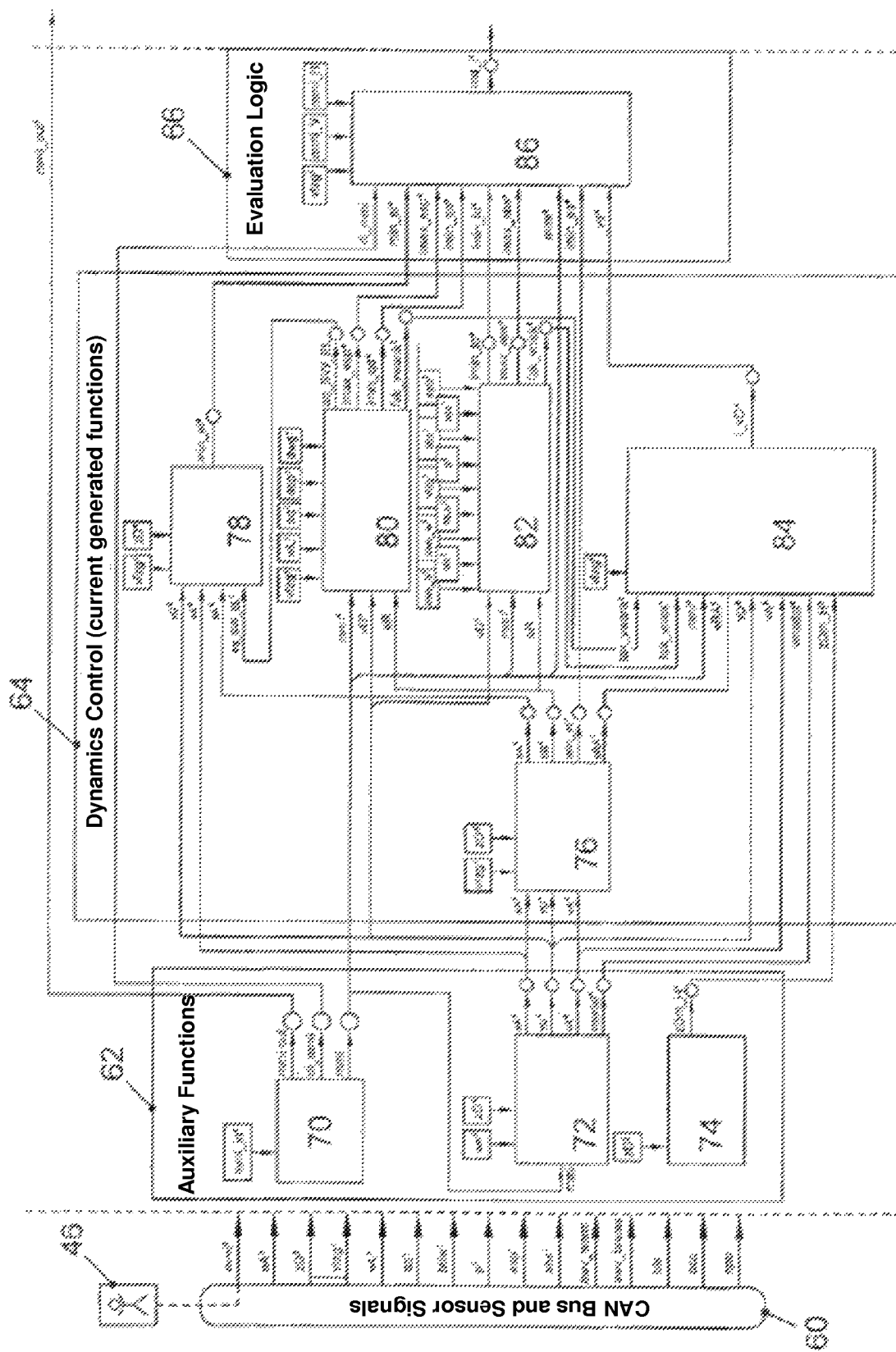
FIG. 19 shows a signal flow diagram of an overall system of the shock absorber control system.

FIG. 19 in an overall view shows a signal flow diagram of the whole shock absorber control system. The signal input module 60 comprises incoming sensor parameters of the path sensors and the acceleration sensors, respectively, CAN-signals, error bits as well as further parameters. For example, used as sensor parameters are signals (duty cycle) provided by the relative path sensors 30, 32, 34 and 36 as well as the body acceleration parameters of the vertically measuring acceleration sensors 38, 40 and 42. Included in these parameters are the respective error bits err_pwm_dc_vl/vr/hl/hr and err_adc_aA_vl/vr/hl which provide information if the signals are valid (value 0) or erroneous (value 1). For example, utilized as CAN parameters are to be the brake light switch can_bls, the anti-lock braking state can_ABS, the ESP state can_ESP, the EDS state can_EDS, the EBV state can_EBV, the vehicle speed can_vF, the lateral acceleration can_ac, the yaw angle velocity can_dwg, the steering wheel angle can_wlges (which for example is comprised of driver steering angle, wheel angle or combined steering angle in electric steering units), the braking pressure can_p, the driver desired moment can_Mfw, the longitudinal acceleration from ACC can_al_acc and the longitudinal acceleration can_al_epb. Also for these signals the error bits err_can_xx are required. Furthermore, the current position of the switching means 46 mmi_in is utilized. Further, it is reasonable to read in the currents adc_i_vl/vr/hl/hr measured back from the shock absorbers 22, 24, 26 and 28, as well as the shock absorber error parameters err_D_vlfvr/hl/hr and the terminal 30 voltage from the control device 44.

Furthermore, a signal dgn_i_bypass is transferred which includes if the control device software (basic software) is currently bypassing control system (functional software), this is to say ignores or overwrites the current request of the functional software. A further signal dgn_i_Iim includes information if the control device software reduces the control range of the current. For a proper calculation of the relative path parameters the basic setpoint parameter bdi_pwm_dc_vl/vrlhl/hr and bdi_z_anp_vl/vr/hr, respectively, further has to be indicated. Correspondingly, this parameter is trained by a training procedure bdi_modus during the start of operation of the control device. Optionally it is also feasible to integrate information about the operating system utilization ratio as signals osk_ausl_xx.

The signal output module 68 is comprised of the setpoint current mdl_i determined in the control system, the mode output mdl_mmi_out and the values from the functional diagnosis mdl_err_xx. Further, a value range is indicated within which the sensors can be trained. These are the signals mdl_pwm_max/min_vl/vr/hl/hr as well as rndl_z_anp_min/rnax_vl/vr/hl/hr. Further reasonable parameters are the function state of the control system rndl_fkt as well as IDs describing the code, the data record as well as the interfaces mdl_xx/id, as well as an indication if the data record matches with the code mdl_param_io and the control system thus may operate reasonably.

The signal input module 60 thus assumes a standardization, conversion and calculation of all signal inputs applied to the interface into a physical standard format indicated in si units.

The signal output module 68 realizes a standardization, conversion and calculation of all signal outputs to the format defined in the interface to the basic software.

The filtering module 72 serves to detect the vertical body corner velocities, the vertical modal velocities (for vehicle roll and pitch) and the shock absorber velocities from the sensors for the body acceleration and the relative path between body and wheel. For this, the parameters are filtered accordingly.

The man-machine-interface module 70 allocates the control unit modes comfort, normal and sport to the respective mmi-pushbutton display of the switching means 46 from the basic software. Further, it is communicated to the basic software which mode is active in the control unit.

It is the object of the roadway recognition module 76 to recognize the roadway condition. To do so, the respective energy proportions for wheel and body are determined Both proportions then are summed up to a combined wheel body energy which then is input to all modules regarding the roadway factor.

The load recognition module 74 determines the quasi static relative path position form the relative path information of the rear axle by means of a respective long-wave filtering. This may be processed into a load dependent modification of the current requirement in downstream modules. The object of the vertical dynamics module 84 comprising the elements individual wheel (ye) and modal (vm) is the harmonization and minimization of the body oscillations in consideration of conditions like driving speed and roadway condition and the like. The individual wheel control serves to cause a horizontal orientation of the body by means of damping the separate vehicle corners. It is an advantage that the sensor system, as well as the actuating elements (shock absorbers), is arranged at the vehicle corners so that a locally and temporally correct/lossless intervention is feasible at these positions. The body velocity serves as a substantial control parameter. A minimization of the body movement at the separate corners is not sufficient since a driver further senses the coupling of the movement which for example leads to pitch or vehicle roll processes. This slowdown of the body 20 may only be caused by a respective damping of the modal movements. The effect of the vertical control thereby may vary with parameterization so that for example in the comfort mode the body 20 is decoupled from the roadway as far as possible while in the sportive mode a direct roadway contact is communicated.

The lateral dynamics module 80 allows for an optimal damping setting in driving situations comprising increased dynamics and/or security requirements. It is an object to minimize a body movement due to steering movements. In parallel it has to be ensured that no increased wheel load variations occur which would lead to a corresponding lesser road grip of the wheels. With respect to the lateral dynamics it is distinguished between quasi-stationary and dynamic movements. The former can only be supported conditionally by the shock absorber since it cannot exert a force stationary. In case an ESP intervention takes place already a situation relevant to driving security is present in which only a preferably optimal wheel damping is important. Depending on roadway condition this may be set variably so that a wheel hop due to marginal and/or excess damping is avoided.

Taking place in the longitudinal dynamics module 82 is a allowance of the damping requirements during launch and braking actions. Body pitch movements during braking and acceleration actions are reduced. As with the lateral dynamics also here a combination of the requirements with respect to comfort (comprising low body movements) and security (comprising low wheel load variations) is allowed for. As with ESP interventions a roadway adapted optimal wheel damping is applied with anti-lock braking interventions.

It is the object of the end position shock absorbing module 78 to avoid hitting noises caused by mechanical hits in the shock absorber during tension and compression. This is achieved in that by means of the current control the shock absorber velocity is reduced in the end position ranges accordingly.

By means of respective status ratings the requirements from the preceding adjustment and control modules are summarized in the current calculating module 86. In this connection the driving safety is generally considered more important than the driving comfort during the control of the shock absorbers 22, 24, 26 and 28. In the case of driving maneuvers relevant to driving dynamics or in the case of system constraints, for example errors, always a shock absorber condition providing driving safety is set, for example by means of the control algorithms.

It becomes apparent that by means of the filtering module 72 of the vertical dynamics module 84 and the end position module 78 in particular the convenience requirement is realized. Requirements related to sportiness and/or driving safety in particular are realized in a status dependent manner for quasi-stationary and for dynamic activities by means of the filtering module 72 and the longitudinal dynamics module 82 as well as the lateral dynamics module 80.

The current calculating module 86 is responsible for decoupling the different adjustment requirements and the selection of the optimal control factor.

Different requirements with respect to sampling intervals arise from the separate modules of the shock absorber control system. In the case of sufficient computing power all modules could be calculated using the fastest pattern, for example a 1 ms pattern. However, this even cannot be realized using latest generation control devices 44. Therefore, for reasons of computing time it is meaningful to realize the control-sided design of the modules so that they comprise different sampling intervals, for example 1 ms, 5 ms, 10 ms and 100 ms, respectively.

Figure 20:
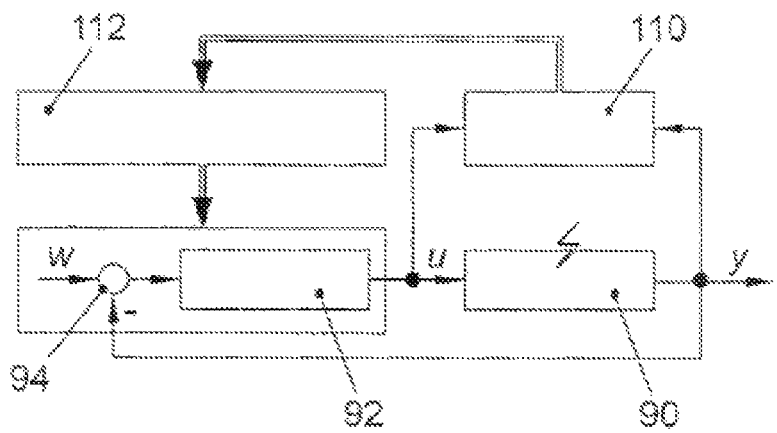
FIG. 20 shows a block diagram of a error-tolerant control system.

Shown in FIG. 20 is a control loop which is extended by a monitoring level. Hereby, a error-tolerant control system may be realized. Here, the common control loop depicted in FIG. 15 is complemented by an error diagnosis module 110. This error diagnosis module 110 monitors the input and output parameters of distance 99 and thus monitors the control loop and determines the error state condition of the closed loop controlled system. The estimation of the error detected is forwarded to a module 112 for the adaptation of the control unit. According to the error state condition detected the control unit 92 is accessed via the module 112 so that minimal required adjustment goals may be achieved.

By means of the error diagnosis module 110 and the control unit adjusting module 112, respectively, in the phase from the occurrence of an error until a potential workshop stop the provision of the damping by means of substitution values and emergency functions may thus be maintained in the shock absorber control system to an extent that further driving is possible with limited comfort. In the case of a detection of an error of an input signal the algorithm substitutes the missing information by a substitution value, which as a general rule may be calculated from processing other signals. Preferably, this substitution value should well characterize the respective signal characteristics and favorably is dynamic for providing satisfactory results. In the case of a malfunction of one or several sensors and actuators, respectively, depending on the error situation individual emergency operation actions are taken. Now, the control processes are continued using the substitution value, whereby a minimum functionality of the adjustment is ensured also in the case of the occurrence of an error.

The error handling is carried out according to the following scheme. Error occurs, error is detected, error is registered, further consequences of the error are prevented, error is handled (for example error tolerance), error is resolved (reparation), go on working. It is desirable to detect and to handle the errors before they may show recognizable consequences, wherein, however, always a trade-off between cost and benefit, this is to say between costs, output, transparency, error tolerance level and the like, is to be considered.

In the related art error tolerance is known as the characteristic of a technical system to also maintain its mode of operation when an input or an error occurs unexpectedly, for example in hardware or software. Error tolerance improves the reliability of the system.

In systems not relevant for security error tolerance is often applied for increasing the availability of the systems or to guarantee the security of the security systems. A differentiation is made between error security (fail safe) and a mild step back (fail graceful). In the case of error security the system changes over into a secure stable operating state at the detection of errors or malfunctions and remains there until the cause is eliminated or repaired. For example, in the case of semi-active shock absorbers without applying a current often a bypass valve is opened which switches to a fail safe characteristic curve which is non-critical with respect to aspects of driving safety. In the case of a step back, the system keeps on operating at a detection of an abnormality but does not anymore provide the full coverage of its functions or velocity until the error is eliminated.

The consideration of error messages may be carried out by an involvement of a diagnosis level in the control algorithms described by means of the preceding Figures. This may be embedded horizontally along the data flow paths but also vertically in the hierarchy of the modules.

In the input interface 60, the input signals each are to be supplemented by an error signal and an error state condition signal, respectively. In particular, this is required in the case of parameters which cause a direct influence on the adjustment, as for example the sensor parameters including the CAN parameters.

In addition, the input interface 60 as well as the output interface 66 may be amended by general information. A part of this, for example, is the information concerning the status of the respective component, such as basic software and control unit. Further, the identification information should be exchanged if the components match, so that only versions associated to each other are coupled to each other. In the case of a deviation the control device 44 changes over into emergency operation.

Furthermore, static substitution values may be handed over at the interfaces, since error and substitution values are often coupled to each other in an error handler. Here, it is feasible to deliver the substitution values instead of the actual signal parameters or to provide these in a separate signal input. A separate signal input is favorable for the following reasons. On the one hand, in the so called pending phase in which it is not yet known if an error really is existent it may be decided which value is used in a subsequent adjustment. On the other hand, the actual signal parameters for a functional diagnosis or for the checking for "good recovery" of errors are provided. In particular the aspect of checking for "good recovery" has a high significance since it increases the availability of the system. Furthermore, it may be favorable in initialization cycles when initial values and not substitution values are delivered as signals, for example.

Also the output interface 68 is amended by respective error signals. These at least have to provide information to which extent the requested control parameter erroneous and in which status the control unit resides, respectively. These status may be "okay", "okay with restriction", "emergency operation", "fail safe" or the like. Further, the output signals are provided with an error status. If required, also here a substitution value may be determined.

Thereby, the error status may have the most different states, as for example "okay", "not okay", "error pending" (error identified but not yet qualified), "not installed" and so forth.

Further, provided in the signal input module 62 is an error module 114 which evaluates the error status of the input signals. Here, for example, also error indices may be determined Accordingly, for providing the output signals to the interface 68, an error module 116 may also be amended in the signal output module 66.

Furthermore, the forming of substitution values is provided for. This may be carried out in a separate module 118 which, for example, may also be arranged in the signal input, which, however, may also be integrated into the error module 114. Here, amongst others, it has to be decided if and in which manner a switching back to substitution values is carried out.

Additionally, an emergency operation module 120 may be provided which carries out general interpretations for the emergency operation strategy and forwards that to the subsequent modules accordingly. Here, an integration into the signal input module 62 and/or into the signal output module 66 may be carried out. In the signal input module 62, for example, a calculation of the control unit state and of the emergency operation information for the separate control unit may be carried out, respectively. For example, realized in the signal output module may be the implementation of current limits and current ranges, respectively.

Aside from these error modules further favorable is the involvement of a functional diagnosis. Preferably, this is also arranged in the signal input module 62. Its error forwarding then may be directly formed as in the input signal errors. It is also feasible to integrate this diagnosis module 122 into an error handler. However, since the functional diagnosis often is designed based on models or based on knowledge, an integration into the control unit structure is advisable.

If required, the separate modules 76, 78, 80, 82, 84 of the control unit module 64 may also be provided with additional input parameters such as for example error status of separate signals, error index and error indices, respectively, as well as control unit or emergency operation status and emergency operation state, respectively. Here, substitution value signals may either be applied instead of the actual signal value or as a separate signal input. Exactly during the pending phase of an error the provision of the actual signal value as well as of a respective substitution value may be favorable.

The alternatives of the allocation of the separate modules and the processing steps just mentioned, respectively, are merely by way of example. Of course, also other allocations implementing the respective functions are feasible.

The error, diagnosis and substitution value modules, respectively, may be integrated into the existing control unit structure as clarified in FIG. 6 and FIG. 19, respectively.

Figure 21:
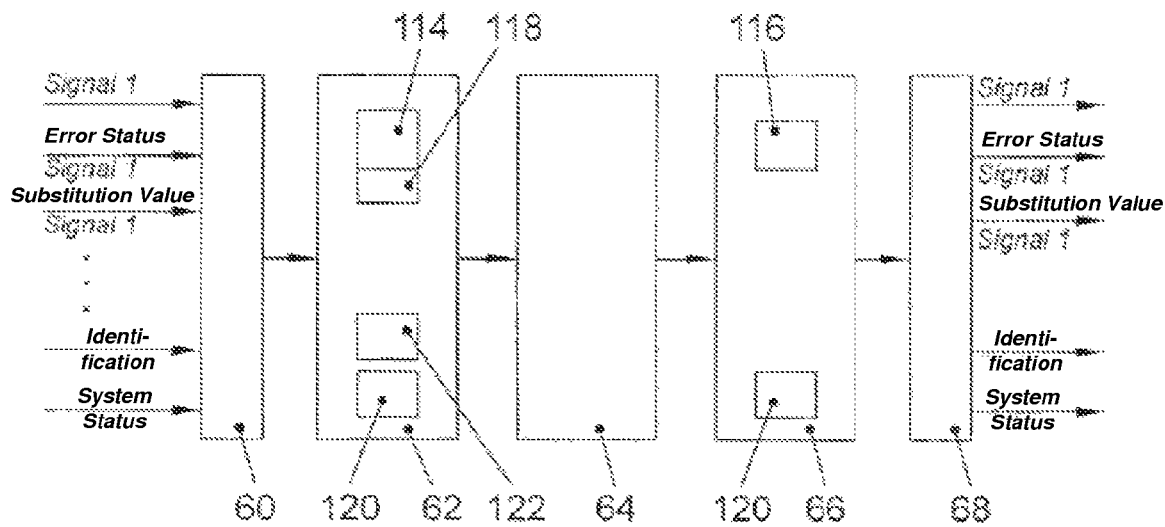
FIG. 21 shows a signal flow diagram of the shock absorber control system comprising error management.
Figure 22:
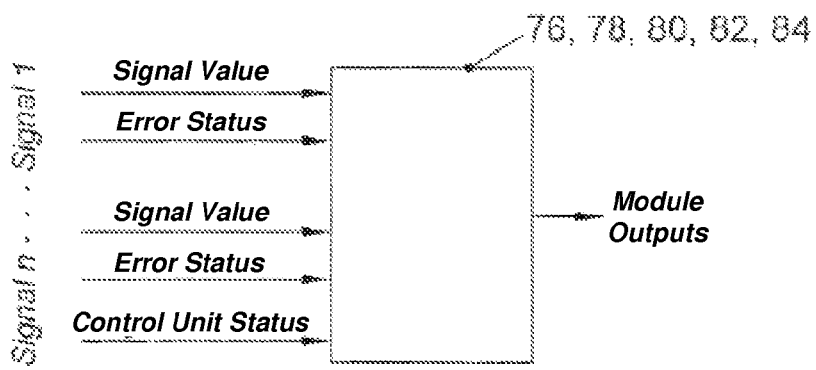
FIG. 22 shows a schematic block diagram of a control unit module including error and status information.

For this, the control unit structures adapted accordingly are depicted in FIGS. 21, 22 and 23.

FIG. 21 shows an addition according to FIG. 6, wherein here the error status signal and the substitution value signal of a signal each are additionally applied to the input interface 60. Accordingly, for each signal an error status signal and a substitution value signal is output at the output interface 66. Furthermore, at the input interface 60 identification signals and system status signals are read and at the output interface 68 respective identification signals and system status signals are output. In the signal input module 62 and the control unit module 64 and the output module 66, respectively, the respective modules described are integrated.

FIG. 22 shows a separate module, for example the roadway recognition module 76, the end position module 78, the lateral dynamics module 80, the longitudinal dynamics module 82 or the vertical dynamics module 84. Additionally provided at each of the modules via additional inputs then are the error status signals and control unit status signals corresponding to the signal values, respectively.

It therefore holds true for the error management that it comprises diagnosis modules, substitution value modules and/or emergency operation modules. By means of the error management the control performance is increased and the availability of the shock absorber control units is improved. The interface between basic software and functional software (shock absorber control unit) is upgraded by identification signals so that the check for a concrete interaction may be carried out. Thus, it may for example be ensured that a certain basic software version is only allowed to communicate with the present shock absorber control unit version. The interface between basic software and functional software comprises the actual signal as well as also a second parallel signal about the status and/or the substitution value of the signal value. It may for example include the messages "correct", "erroneous", "initial", "substitution value" or the like. A separate error module may be provided for which evaluates the separate error state conditions and summarizes an overall error status. A substitution value module may be provided for that depending on the error state condition calculates substitution values for the signal inputs of the control unit modules, so that these may operate reasonably also in the case of an error. A control unit state/emergency operation module may be provided for that communicates to the control unit modules the actual control unit state and that optionally prompts other adjustment strategies. Furthermore, a functional diagnosis is provided for that determines an error status based on the evaluation of the function of the sensors and/or actuators involved. Besides the actual inputs, the control unit modules themselves comprise further inputs for the signals which provide substitution values, control unit state and the like as additional information.

The various embodiments therefore relate to a method or system for controlling the movement of a vehicle comprising electronically controllable shock absorbers, wherein in the control system the requirements, feasible in parallel, for "comfort layout" and "high sportiness" as well as driving security all are considered and de-coupled to a large extent by using status dependent adjustment modules, in particular for driving conditions (vertical, longitudinal and lateral dynamics), loading conditions, energy states (body, shock absorber, wheel, roadway) and driver activities (acceleration, braking, steering, gear selection, shock absorber mode selection).

REFERENCE NUMERALS

10 motor vehicle
12 wheel
14 wheel
18 wheel
18 wheel
20 body
22 shock absorber
24 shock absorber
26 shock absorber
28 shock absorber
30 path sensor
32 path sensor
34 path sensor
56 path sensor 38 acceleration sensors
40 acceleration sensors
42 acceleration sensors
44 control device
46 switching means
48 spring
50 spring
52 spring
54 spring
56 center of gravity
57 characteristic curve
58 lift
60 signal input module
61 pitch
62 help function module
63 vehicle roll
64 control unit module
66 signal output module
68 signal output module
70 man-machine-interface module
72 filtering module
74 load recognition module
76 roadway recognition module
78 end position shock absorbing module
80 lateral dynamics module
82 longitudinal dynamics module
84 vertical dynamics module
97 current calculating module
90 distance
92 control unit
94 comparator
96 control element
98 measuring element
100 combination unit
102 individual control unit
104 module elements
106 module elements
108 combination unit
110 error diagnosis module
112 control unit adjusting module
114 error module
116 error module
118 module
120 emergency operation module
122 diagnosis module

What is claimed is:

1. A method for moderating movement of a vehicle body of a motor vehicle, the method comprising the steps of:
detecting the movement of the vehicle body by means of sensors,
feeding sensor signals corresponding to detected sensor values to a shock absorber control unit,
generating a control signal with the shock absorber control unit based at least in part on the detected sensor values; and
controlling actuators with the control signal to moderate the movement of the vehicle body,
wherein the control signal further depends on status dependent control algorithms using status dependent filters and status dependent longitudinal and lateral dynamics modules for quasi-stationary and for dynamic processes,
the status comprising selectable requirements for the movement of the vehicle body and driving safety requirements including at least a selectable demand for sportiness and a selectable demand for driving safety, and
wherein the control signal further depends on at least one of the following: current and anticipated driving conditions, loading conditions, energy states, and driver activities.

2. The method according to claim 1, wherein the actuators are semi-active or active shock absorbers.

3. The method according to claim 1, wherein a control current directly manipulating the actuators is provided as the at least one control signal.

4. The method according to claim 1, wherein as selectable requirements for the movement of the vehicle body it may at least be selected between comfort and sportiness.

5. The method according to claim 4, wherein the selection may be carried out continuously variable or in steps between high comfort and high sportiness.

6. The method according to claim 1, wherein as driving conditions at least one of the vertical dynamics, the longitudinal dynamics, and the lateral dynamics of the vehicle are allowed for.

7. The method according to claim 1, wherein as energy states the energy states of at least one of the body, of the wheel, of the roadway, and of the actuators are allowed for.

8. The method according to claim 1, wherein as driver activity the actuation state of at least one of the accelerator pedal, of the brake pedal, of the steering, and of the gearbox is allowed for.

9. The method according to claim 1, wherein a convenience requirement is realized in the control algorithms.

10. The method according to claim 9, wherein the convenience requirement is realized in the control algorithms by means of the utilization of at least one of: at least one status dependent filter, at least one status dependent vertical dynamics module for at least one of the individual wheel movement and the overall movement of the body, and at least one status dependent end position module.

11. The method according to claim 10, wherein the convenience requirement is realized in the control algorithms further in consideration of the energy states of at least one of body, shock absorber, wheel and roadway.

12. The method according to claim 10, wherein the overall movement of the body comprises at least one of lift, vehicle roll and pitch.

13. The method according to claim 1, wherein the at least one of the demand of sportiness and the demand of driving safety is realized further in consideration of the energy states of at least one of body, shock absorber, wheel and roadway.

14. The method according to claim 1, wherein the status dependent control algorithms are carried out separately or in combination by the conditions and requirements.

15. The method according to claim 1, wherein the code of the adjustment algorithms is executed in the shock absorber control unit using different time patterns, wherein at least one fast pattern comprising a time pattern between 0.5 ms and 5 ms or a 1 ms pattern and a 5 ms pattern, and at least one slower pattern comprising a time pattern >5 ms or a 10 ms pattern and a 100 ms pattern, exist.

16. The method according to claim 1, wherein the status dependent control algorithms allow for superordinate messages.

17. The method according to claim 16, wherein at least one of diagnosis signals, substitution value signals, and emergency operation signals are allowed for as superordinate messages.

18. A system for manipulating the movement of a vehicle body of a motor vehicle controllable or adjustable in its movement processes, the system comprising:

sensors which detect the movement of the vehicle body,
controllable or adjustable actuators arranged between the vehicle body and the vehicle wheels, and
a shock absorber control unit by means of which the sensor signals are processed and a control signal adjusts the operation of the actuators,
wherein the shock absorber control unit comprises modules generating the control signal for the actuators based at least in part on the sensor signals,
wherein the control signal further depends on user-selectable requirements for the movement of the vehicle body including at least a selectable demand for sportiness and a selectable demand for driving safety and further depends on at least one of the following: current and anticipated driving conditions, loading conditions, energy states, and driver activities; and
wherein the modules employ status dependent control algorithms using status dependent filters and status dependent longitudinal and lateral dynamics modules for quasi-stationary and for dynamic processes.

19. The system according to claim 18, wherein the actuators are semi-active or active shock absorbers.

20. A method for moderating movement of a vehicle body of a motor the method comprising the steps of:

detecting the movement of the vehicle body by means of sensors;
feeding sensor signals corresponding to detected sensor values to a shock absorber control unit;
generating a control signal with the shock absorber control unit based at least in part on the detected sensor values; and
controlling actuators with the control signal to moderate the movement of the vehicle body;
wherein the control signal further depends on status dependent control algorithms, the status including selectable requirements for the movement of the vehicle body and driving safety requirements;
the status dependent control algorithms are executed in the shock absorber control unit using different time patterns, including a fast pattern comprising a time pattern between 0.5 ms and 5 ms or a 1 ms pattern and a 5 ms pattern, a slow pattern comprising a time pattern >5 ms or a 10 ms pattern and a 100 ms pattern, and
the control signal further depends on at least one of the following: current and anticipated driving conditions, loading conditions, energy states, and driver activities.

* * * * *